A. F. GLASER & J. OLSEN.
RESILIENT WHEEL.
APPLICATION FILED JULY 19, 1909.

1,026,505.

Patented May 14, 1912.

Witnesses:

Inventors
A. F. Glaser & J. Olsen,
By their Attorney
T. F. Bourne

UNITED STATES PATENT OFFICE.

ADAM F. GLASER, OF JERSEY CITY, AND JOHN OLSEN, OF WHIPPANY, NEW JERSEY, ASSIGNORS OF ONE-THIRD TO GEORGE W. CRANE, OF RAHWAY, NEW JERSEY.

RESILIENT WHEEL.

1,026,505.   Specification of Letters Patent.   Patented May 14, 1912.

Application filed July 19, 1909. Serial No. 508,430.

*To all whom it may concern:*

Be it known that we, ADAM F. GLASER and JOHN OLSEN, citizens of the United States, and residents of Jersey City, Hudson county, New Jersey, and Whippany, Morris county, New Jersey, respectively, have invented certain new and useful Improvements in Resilient Wheels, of which the following is a specification.

Our invention relates to improvements in resilient wheels wherein an axle is resiliently connected with the wheel hub, whereby the axle and hub may have movement relatively to each other, means being provided for causing the axle to rotate the hub, or vice versa, while maintaining resilient relation to each other, and our invention has particular reference to improvements in the class of resilient wheels shown in United States Letters Patent No. 912,305, issued to us February 16, 1909.

The nature of our invention will be more fully hereinafter set forth and then pointed out in the claims.

Figure 1:
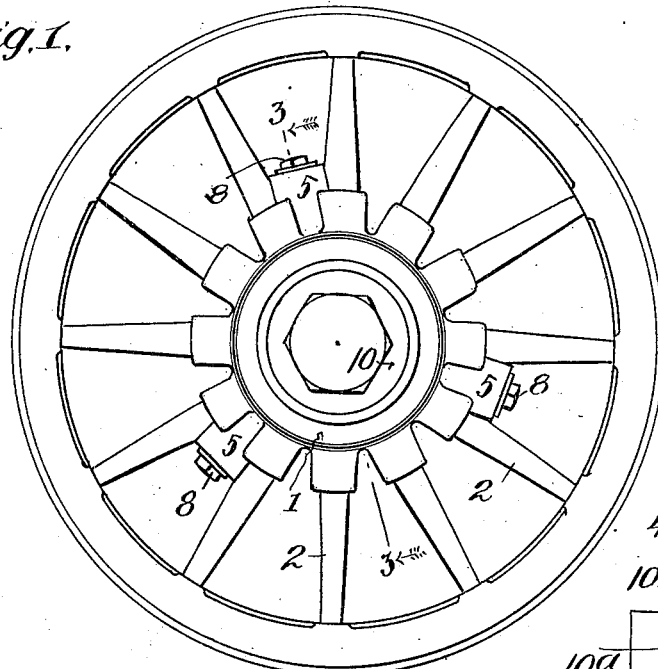
Figure 3:
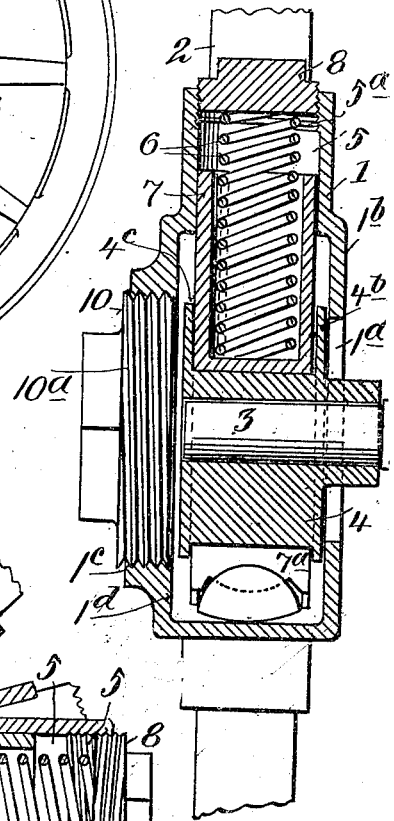
Figure 2:
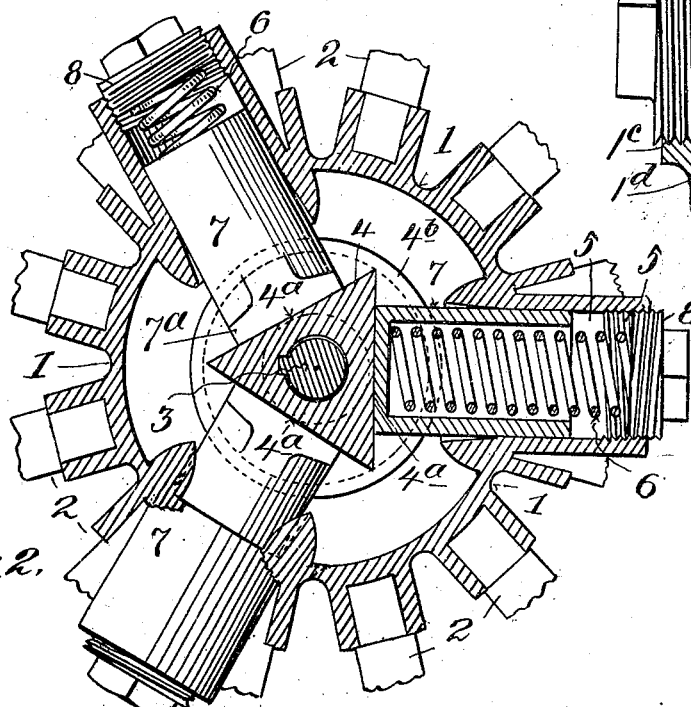

Reference is to be had to the accompanying drawings forming part hereof, wherein, Figure 1 is a side view of a wheel embodying our invention; Fig. 2 is an enlarged sectional view of the central portion of the wheel, and Fig. 3 is an enlarged section, substantially on the plane of the line 3, 3, in Fig. 1.

Similar numerals of reference indicate corresponding parts in the several views.

The numeral 1 indicates a hollow hub or casing of any suitable construction connected with spokes 2 in any suitable or well known manner, and at 3 is an axle adapted to have free movement in all directions within opening 1ª in one of the walls 1ᵇ of the hub or casing.

At 4 is a head or cam member located within hub or casing 1, to which head or cam member axle 3 is to be attached in any suitable manner, as by a key. The cam surfaces or faces 4ª of head 4 are in angular form with relation to each other. In the example shown in Fig. 2 the cam or working faces 4ª of head 4 are shown in the form of an equilateral triangle, although it will be understood that the working cam faces of head 4 may have any other suitable form.

Hub or casing 1 is provided with guideways 5, shown disposed on opposite sides of the axis of the hub, said guideways being shown substantially in the form of cylinders within which are springs 6 that co-act with head 4 and hub or casing 1, resiliently connecting the axle and said hub or casing.

At 7 are thrust and bearing pieces shown in the form of pistons or blocks mounted to slide in guideways 5 and adapted to bear against the corresponding faces 4ª of head 4, the springs 6 being shown located within and acting with the thrust pieces or pistons 7 to hold the latter against said cam faces. The springs 6 also co-act with hub or casing 1, for which purpose we have shown screw plugs 8 meshing with threads 5ª in guideways or cylinders 5 whereby said blocks connect the springs operatively with the hub or casing. By screwing blocks 8 into the cylinders more or less the tension of the springs may be regulated as desired, and the plugs 8 may be removed for ready replacement of the springs. We have shown the thrust pieces or pistons 7 as provided with heads 7ª of such dimensions as to prevent said thrust pieces or pistons from sliding out of their guideways or cylinders 5 in an outward direction. While plugs 8 are a convenient means for connecting springs 6 with hub or casing 1, other means may be provided for this purpose if desired. Head 4 is shown provided with a flange or disk-like portion 4ᵇ adapted to fit and slide along the inner face of wall 1ᵇ and close opening 1ª, and said head 4 is also shown provided with a flange or disk-like portion 4ᶜ at the side opposite the flange 4ᵇ, between which flanges the thrust pieces or pistons 7 fit freely. Hub or casing 1 is also shown provided with an opening 1ᶜ on the side opposite opening 1ª of sufficient dimensions to permit the entrance of head 4 and its flanges, and the opening 1ᶜ is maintained closed by a block or plug 10 shown provided with threads 10ª meshing in corresponding threads in the wall of opening 1ᶜ, although the closure 10 may be otherwise secured to hub or casing 1. The sides of block 4 or its flanges 4ᵇ, 4ᶜ in conjunction with walls 1ᵇ, 1ᵈ of the hub or casing 1 resist side thrust of head 4, for which purpose closure or block 10 may be set as close to the corresponding surface of head 4 and its flange 4ᶜ as desired.

The springs 6 will serve to normally maintain the head 4 and the axle substantially axially with respect to hub or casing 1 by reason of the correlation of the various parts. Weight upon the axle will be correspondingly resisted by the springs, as such weight is transmitted through head 4 to said springs, and when the axle is rotated the cam faces of head 4 acting through thrust pieces or pistons 7 against the springs will be resisted by said springs, and the thrust pieces or pistons 7 in their guideways will transmit rotary motion to the hub and wheel or vice versa. When the wheel meets obstructions or depressions in the road the shock will be relieved or absorbed and the axle correspondingly relieved from shock as the axle has free movement within the hub or casing, and the cam faces of head 4 may slide with respect to thrust pieces or pistons 7, such sliding of said thrust pieces or pistons being resisted by the springs while the tendency of the springs in connection with the thrust pieces or pistons and the cam faces of the head to restore or maintain the axle in proper operative position. By having three springs arranged radially at 120° apart with a corresponding triangularly disposed head interposed between said springs the tendency is for one or more of the springs to always resist the weight or load, and as the cam faces of the head in certain positions of the wheel tend to slide between two thrust pieces or pistons 7 the weight or strain will be transmitted to the corresponding springs. As the arrangement of head 4 or its cam with respect to thrust pieces or pistons 7 is such that said head cannot revolve independently or between said thrust pieces or pistons owing to the resistance of the springs the hub will necessarily be rotated by the head, or vice versa.

While we have illustrated a convenient form of our invention it will be understood that the same is not limited to the details of construction and arrangements shown and described, as the same may be varied, within the scope of the appended claims, without departing from the spirit of our invention.

Having now described our invention what we claim is:

1. The combination of a hub provided with an opening to permit free movement of an axle therein, a head for the axle provided with triangularly disposed faces, thrust pieces co-acting with said faces, and springs interposed between the thrust pieces and the hub.

2. The combination of a hub provided with an opening to permit free movement of an axle therein, a head for the axle provided with triangularly disposed faces, thrust pieces to co-act with said faces, means for operatively connecting said thrust pieces with said hub, and springs interposed between the thrust pieces and the hub.

3. The combination of a hub provided with an opening to permit free movement of an axle therein, a head for the axle provided with angularly disposed cam faces, thrust pieces co-acting with said faces, said head having flanges on opposite sides of said cam faces, the thrust pieces being located between said flanges, said hub having faces co-acting with said flanges, springs interposed between the thrust pieces and the hub, and means retaining said springs in place.

Signed at New York in the county of New York and State of New York this 15th day of July A. D. 1909.

ADAM F. GLASER.
JOHN OLSEN.

Witnesses:
T. F. BOURNE.
RALPH E. ROBERTS.